(12) United States Patent
Thompson

(10) Patent No.: US 6,626,409 B1
(45) Date of Patent: *Sep. 30, 2003

(54) FISHING ROD HOLDER

(76) Inventor: David Thompson, 4012 N. 30th Ave., Hollywood, FL (US) 33020

( * ) Notice: Subject to any disclaimer, the term of this patent is extended or adjusted under 35 U.S.C. 154(b) by 0 days.

This patent is subject to a terminal disclaimer.

(21) Appl. No.: 09/226,711

(22) Filed: Jan. 7, 1999

Related U.S. Application Data

(60) Continuation of application No. 29/074,619, filed on Aug. 5, 1997, now Pat. No. Des. 407,137, which is a division of application No. 29/055,624, filed on Jun. 10, 1996, now Pat. No. Des. 386,557.

(51) Int. Cl.$^7$ .............................................. A01K 97/10
(52) U.S. Cl. ...................... 248/539; 248/538; 248/520; 43/21.2
(58) Field of Search ................................ 248/538, 539, 248/514, 515, 517, 520, 523; 43/21.2; 224/922, 406, 542, 544, 567; D22/147

(56) References Cited

U.S. PATENT DOCUMENTS

| | | | | |
|---|---|---|---|---|
| 1,577,612 A | * | 3/1926 | Dees | 43/21.2 X |
| 2,995,855 A | * | 8/1961 | Bell | 43/21.2 |
| 4,198,775 A | * | 4/1980 | Leisner | 43/21.2 |
| 4,425,729 A | * | 1/1984 | Miyamae | 248/538 X |
| 4,485,579 A | * | 12/1984 | Hawie | 248/538 X |
| 4,802,612 A | * | 2/1989 | Anderson | 224/208 |
| 4,836,127 A | * | 6/1989 | Wille | 248/538 X |
| 4,876,980 A | * | 10/1989 | Bell, III | 248/533 X |
| 4,887,375 A | * | 12/1989 | Shedd et al. | 43/21.2 |
| 4,919,316 A | * | 4/1990 | Grauberger | 248/523 X |
| 5,088,673 A | * | 2/1992 | Chandler | 248/311.2 |
| 5,184,797 A | * | 2/1993 | Hurner | 248/538 |
| 5,301,451 A | * | 4/1994 | VanAssche | 43/21.2 X |
| 5,568,784 A | * | 10/1996 | Willis et al. | 248/514 X |
| D378,398 S | * | 3/1997 | Osburn | D22/147 |
| D386,557 S | * | 11/1997 | Thompson | D22/147 |
| 5,778,592 A | * | 7/1998 | Malmberg | 43/21.2 |

* cited by examiner

Primary Examiner—Gwendolyn Baxter
(74) Attorney, Agent, or Firm—Laurence A. Greenberg; Werner H. Stemer; Gregory L. Mayback

(57) ABSTRACT

The fishing rod holder is adapted to hold fly rods in flush mounts. The rod holder has a first pipe section formed with an insertion opening. An inner diameter of the first pipe section enables an insertion of a fishing rod handle through the insertion opening and into the first pipe section. A second pipe section is rigidly connected to the first pipe section and projects away from the first pipe section distally of the insertion opening. A slot is formed in the first pipe section extending in the insertion direction away from the insertion opening.

7 Claims, 3 Drawing Sheets

US 6,626,409 B1

FISHING ROD HOLDER

CROSS-REFERENCE TO RELATED APPLICATION

This is a continuation of my design application No. 29/074,619 filed Aug. 5, 1997 now U.S. Pat. No. D, 407,137, which was a divisional of application No. 29/055,624 filed on Jun. 10, 1996, now U.S. Pat. No. Des.386,557.

BACKGROUND OF THE INVENTION

Field of the Invention

The invention relates to a fishing rod holder. More specifically, the invention pertains to an adapter which holds a fly rod in a flush mount fishing rod holder.

Fishing boats of typically provided with an array of fishing rod holders in which various rods are held at ready during fishing trips. The rod holders typically include rod holder racks and batteries mounted on the cockpit walls, on so-called rocket launchers, and on radar mounts, and flush mounted holders—also referred to as flush mounts. The flush mounts are inserts with an open face plate attached flat on a wall of the boat and a pipe section projecting from the face plate and into the interior of the boat wall.

Fishing rods are held in such rod holders by inserting the rod handle up to the reel, i.e. up to the clamp which attaches the reel to the rod handle. Rods with longer handles and trolling rods are inserted all the way into the pipe section until the butt of the handle impinges on a pin at the end of the pipe section. The insertion depth is typically in the order of 6 to 12 inches.

Fly rods for fly fishing are different from spinning rods in that fly fishing reels are attached very close to the fly rod butt. Fly rods can therefore not be inserted into such handle-insertion type mounts to an extent that would suffice to hold the rod vertically or slightly inclined.

SUMMARY OF THE INVENTION

It is accordingly an object of the invention to provide a fishing rod holder, which overcomes the above-mentioned disadvantages of the heretofore-known devices and methods of this general type and which allows fly rods to be held in conventional fishing rod holders such as flush mounts and rod batteries.

With the foregoing and other objects in view there is provided, in accordance with the invention, a fishing rod holder for holding a fishing rod of the type having a handle and a bracket attaching a reel at the handle, the fishing rod holder comprising:

a first pipe section formed with an insertion opening and having an inner diameter enabling an insertion of a handle of a fishing rod through the insertion opening and into the first pipe section along an insertion direction;

a second pipe section rigidly connected to the first pipe section and projecting away from the first pipe section distally of the insertion opening; and the first pipe section having a slot formed therein extending in the insertion direction away from the insertion opening.

In accordance with an added feature of the invention, the first and second pipe sections are integrally formed in one piece. Alternatively, the first and second pipe sections are glued to one another.

In accordance with an additional feature of the invention, the slot is an L-shaped slot having a longitudinal component extending longitudinally from the insertion opening and a transverse component extending transversely away from the longitudinal component in a circumferential direction.

In accordance with a further feature of the invention, the second pipe section has an outer diameter enabling an insertion thereof into a flush mount fishing rod holder.

In accordance with again another feature of the invention, the second pipe section has a plurality of notches formed therein for engaging into an alignment pin in the flush mount fishing rod holder.

In accordance with a concomitant feature of the invention, the slot has a width adapted to a width of a bracket attaching a reel to the fishing rod so as to enable an insertion of the bracket beyond the insertion opening and a given insertion depth into the first pipe section.

Other features which are considered as characteristic for the invention are set forth in the appended claims.

Although the invention is illustrated and described herein as embodied in a fishing rod holder, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
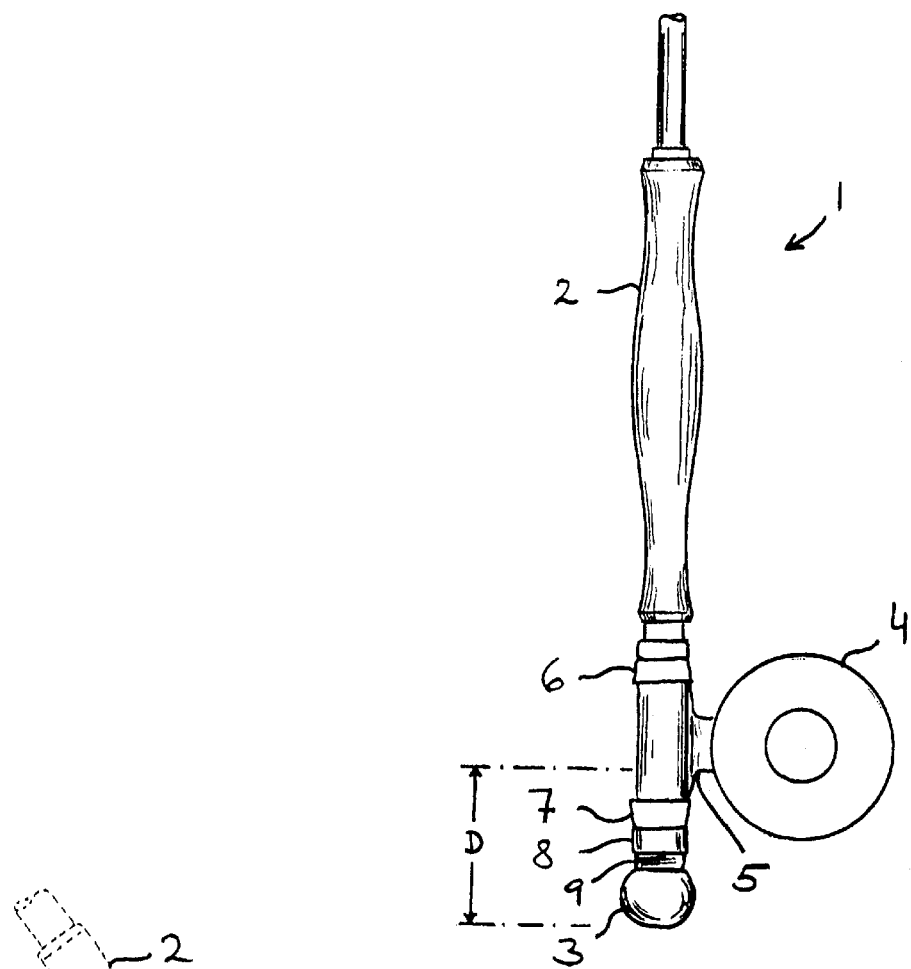
FIG. 1 is an elevational view of a prior art fly rod and reel combination.

Referring now to the figures of the drawing in detail and first, particularly, to the prior art FIG. 1 thereof, there is seen a fly rod 1 with a cork handle 2. A reel 4 is attached between the handle 2 and a butt 3. The attachment of the reel 4 is by way of a conventional bracket 5 which is wedge-clamped between two bracket clamps 6 and 7. The bracket clamp 7 is biased towards the front of the rod with a nut 8 which meshes on a thread 9.

A maximum insertion depth D with regard to a prior art rod holder is defined from a rear of the bracket 5 to the butt 3. In other words, the fly rod can only be inserted into the rod holder up to the bracket 5. The insertion depth D is not sufficient to securely hold the fly rod in the rod holder, specifically in an inclined holder (usually inclined by about 30° from the vertical).

The problem is alleviated with the rod holder according to the invention. With reference to FIGS. 2–5, the novel rod holder 10, which may also be referred to as a rod holder adapter, is formed with a slot 11 at its insertion end that allows the bracket 5 to pass into a pipe section 12 that acts as the holder pipe for the rod. The pipe section 12—in its function—corresponds to the pipe section that is attached to the face place of a flush mount and that projects into the interior of the boat. In terms of a rocket-launcher type rod holder, the pipe section 12 corresponds to the main body of the holder.

The pipe section 12 of the novel rod holder 10 is rigidly attached to (or integrally formed with) a second pipe section 13, also referred to as an extender pipe 13. The extender pipe 13 is adapted to be inserted into the conventional rod holder. In that regard, the extender pipe 13 has an outer diameter OD that corresponds substantially to the outer diameter of a regular spinner rod handle or a trolling rod that can be inserted into a flush mount rod holder. The extender pipe 13 is formed with four alignment notches or slots 14 into which a pin 15 at the bottom of the flush mount rod holder can engage. The notches 14 allow an angular alignment of the rod holder 10 in the flush mount.

The slot 11 may be in the shape of an "L", with a longitudinal slot component and a transverse component 11a. The transverse slot component 11a allows the rod 1 (i.e., the bracket 5) to be locked in the rod holder 10.

Figures 4, 5, 6, 7:
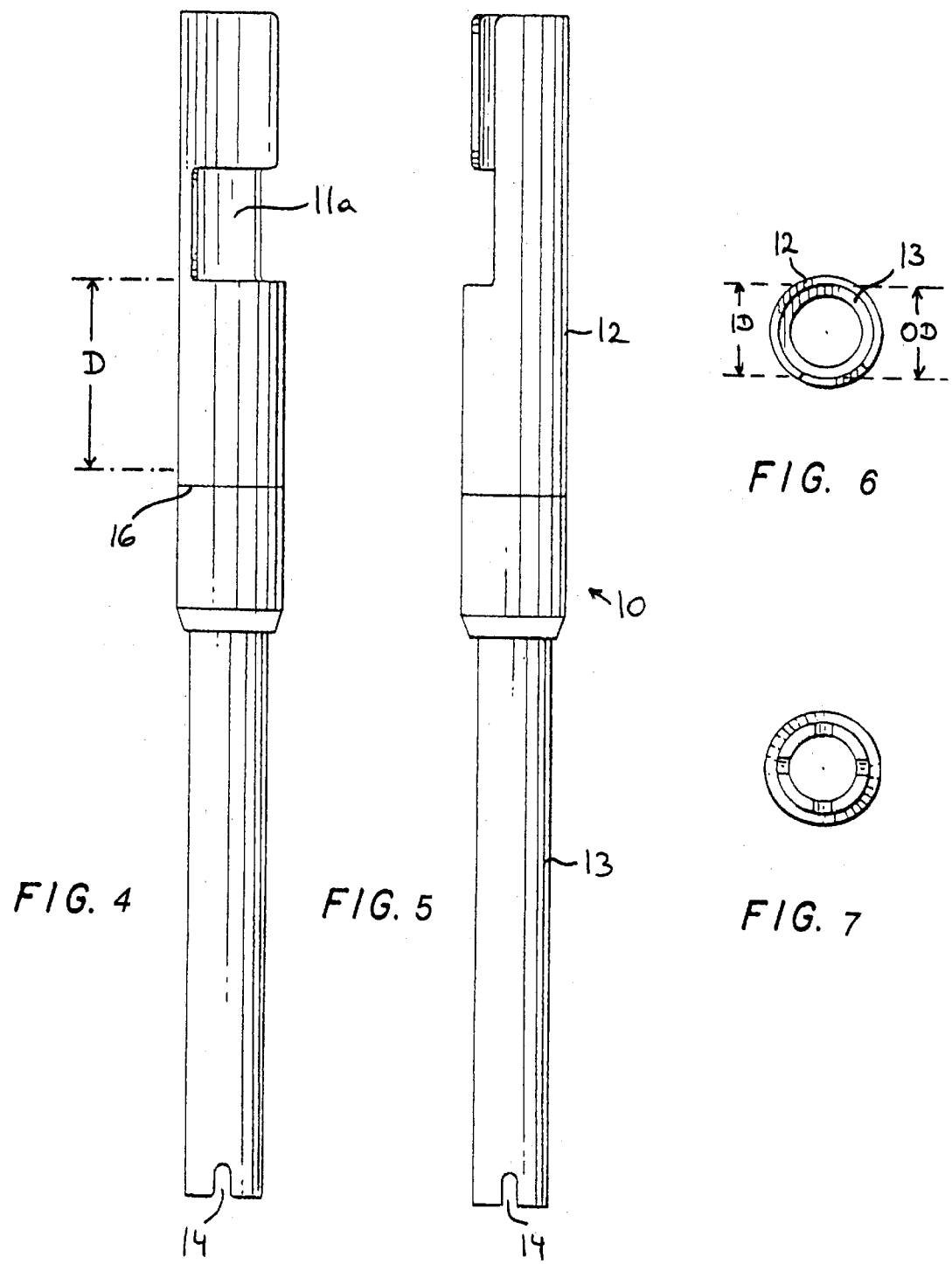
FIG. 4 is a left side elevational view thereof.
FIG. 5 is a right side elevational view thereof.
FIG. 6 is a top-plan view of the holder.
FIG. 7 is a bottom-plan view thereof.

With reference to FIGS. 6 and 7, the inner diameter ID of the pipe section 12 corresponds to the outer diameter OD of the extender pipe 13. The allows efficient manufacture and assembly of the two pipe sections 12 and 13, in particular when the rod holder 10 is formed of PVC. The two pipe sections 12 and 13 may thereby be glued together with so-called PVC cement. In the alternative, the rod holder 10 may also be integrally formed in one molded piece.

With reference to FIG. 4, a spacing from the end of the slot 11 to an insertion line 16 should be at least as great as the (maximum insertion) depth D of the fly rod 1. The insertion line 16 indicates the upper end of the extender pipe 13 after insertion into the pipe 12.

Figure 8:
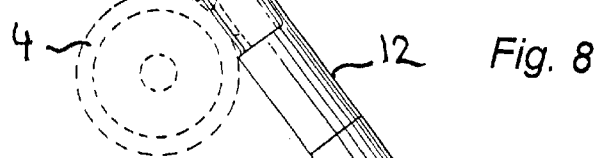
FIG. 8 is a partial side elevation of the rod holder according to the invention inserted into a flush mount.
Figures 2, 3:
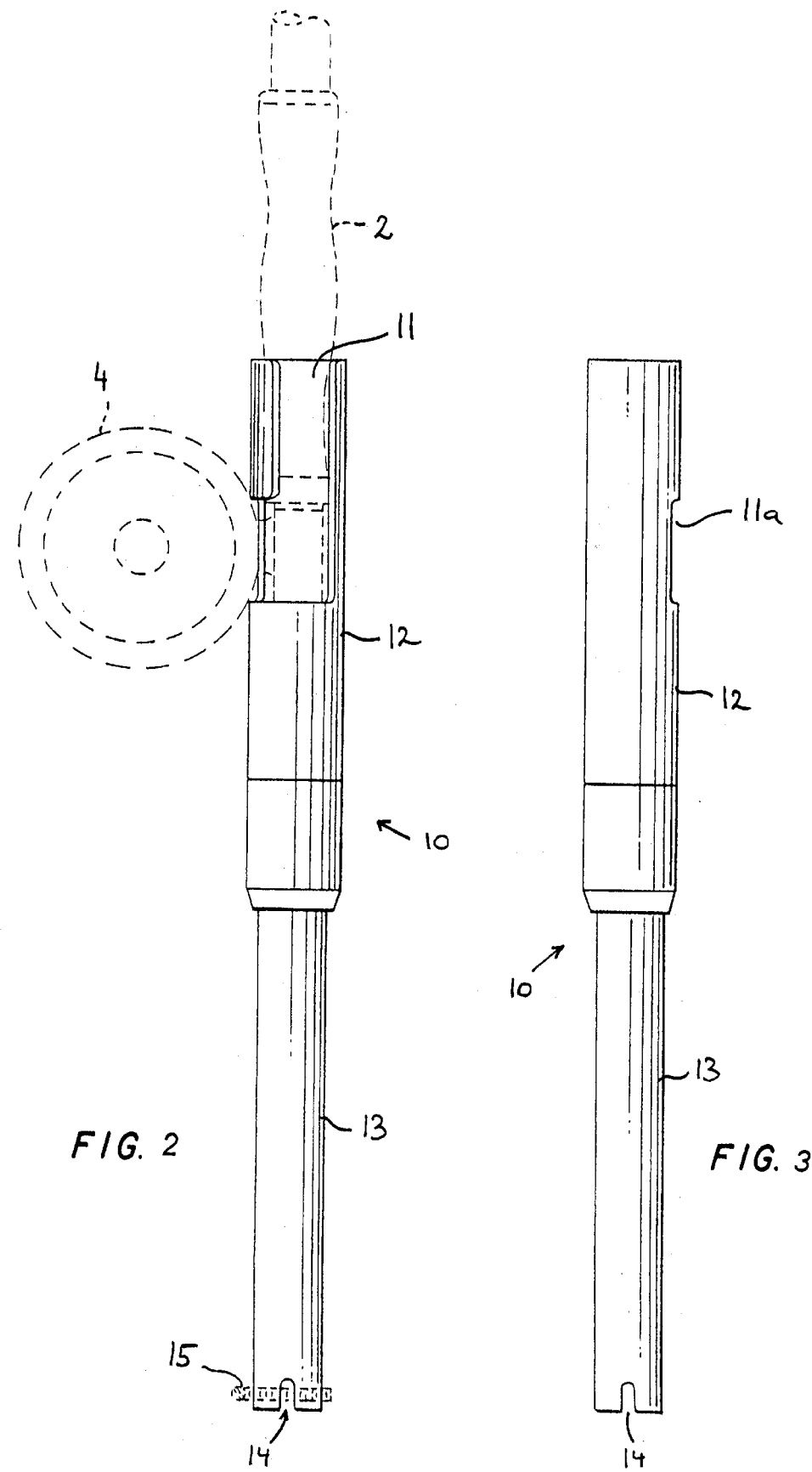
FIG. 2 is a front elevational view of the novel fishing rod holder.
FIG. 3 is a rear elevational view thereof.

With reference to FIG. 8, the rod holder 10 is inserted into flush mount 17. The flush mount 17 includes a mounting plate 18 and an insertion pipe 19 that is attached to the mounting plate 18 at a given angle. The mounting plate 18 is attached to a flat board 20 of a boat wall and the pipe section 19 projects into the interior of the wall. Such flush mounts may also be provided on vertical walls.

I claim:

1. A fly fishing rod holder for holding a fly fishing rod having a handle and a bracket attaching a fly reel at the handle, the fly fishing rod holder comprising:
   a first pipe section having an insertion opening, a connection opening opposite said insertion opening, a longitudinal axis and an inner diameter enabling an insertion of the handle of the fly fishing rod through said insertion opening and into said first pipe section along an insertion direction;
   a second pipe section rigidly connected to said connection opening of said first pipe section along said longitudinal axis of said first pipe section and projecting away from said first pipe section along said longitudinal axis of said first pipe section; and
   said first pipe section having a slot formed therein at said insertion opening extending in the insertion direction away from said insertion opening.

2. The fly fishing rod holder according to claim 1, wherein said first and second pipe sections are integrally formed in one piece.

3. The fishing rod holder according to claim 1, wherein said first and second pipe sections are glued to one another.

4. The fishing rod holder according to claim 1, wherein said slot is an L-shaped slot having a longitudinal component extending longitudinally from said insertion opening and a transverse component extending transversely away from said longitudinal component in a circumferential direction.

5. The fishing rod holder according to claim 1, wherein said second pipe section has an outer diameter enabling an insertion thereof into a flush mount fishing rod holder.

6. The fishing rod holder according to claim 5, wherein said second pipe section has a plurality of notches formed therein for engaging into an alignment pin in the flush mount fishing rod holder.

7. The fly fishing rod holder according to claim 1, wherein said slot has a width adapted to a width of a bracket attaching the fly reel to the fly fishing rod so as to enable an insertion of the bracket beyond said insertion opening and to a given insertion depth into said first pipe section for removably securing the fly fishing rod within the fly fishing rod holder.

* * * * *